Sept. 7, 1965     K. B. BREDTSCHNEIDER     3,204,924
VALVE SEATS AND MOUNTING THEREFOR
Filed May 17, 1962     3 Sheets-Sheet 2
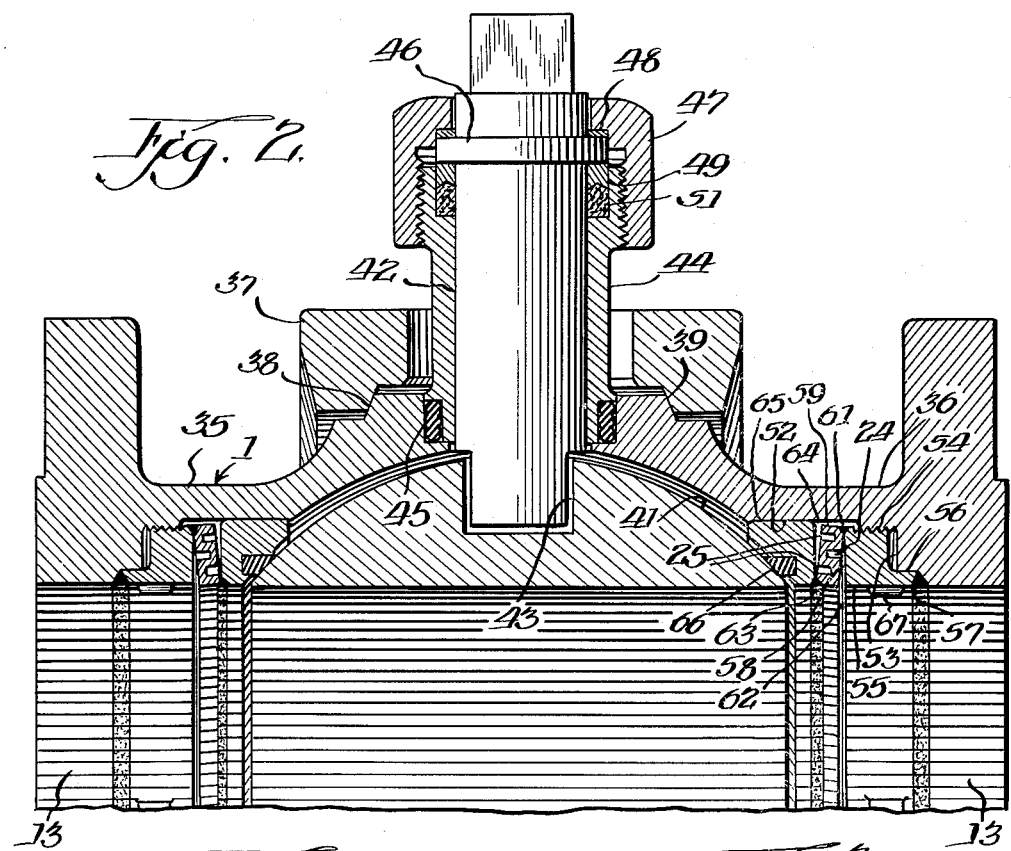
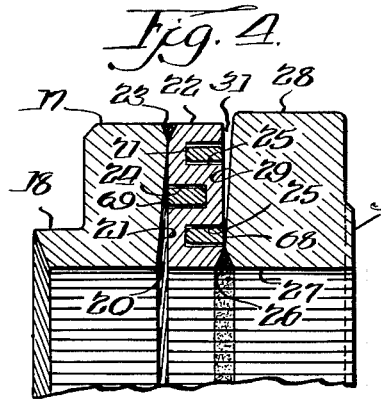
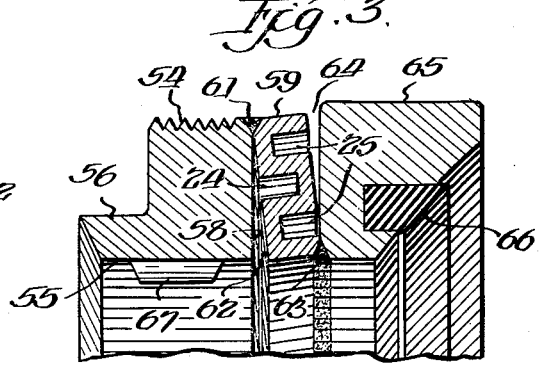
Inventor:
Kurt B. Bredtschneider.
By Joseph O. Lange
Atty.

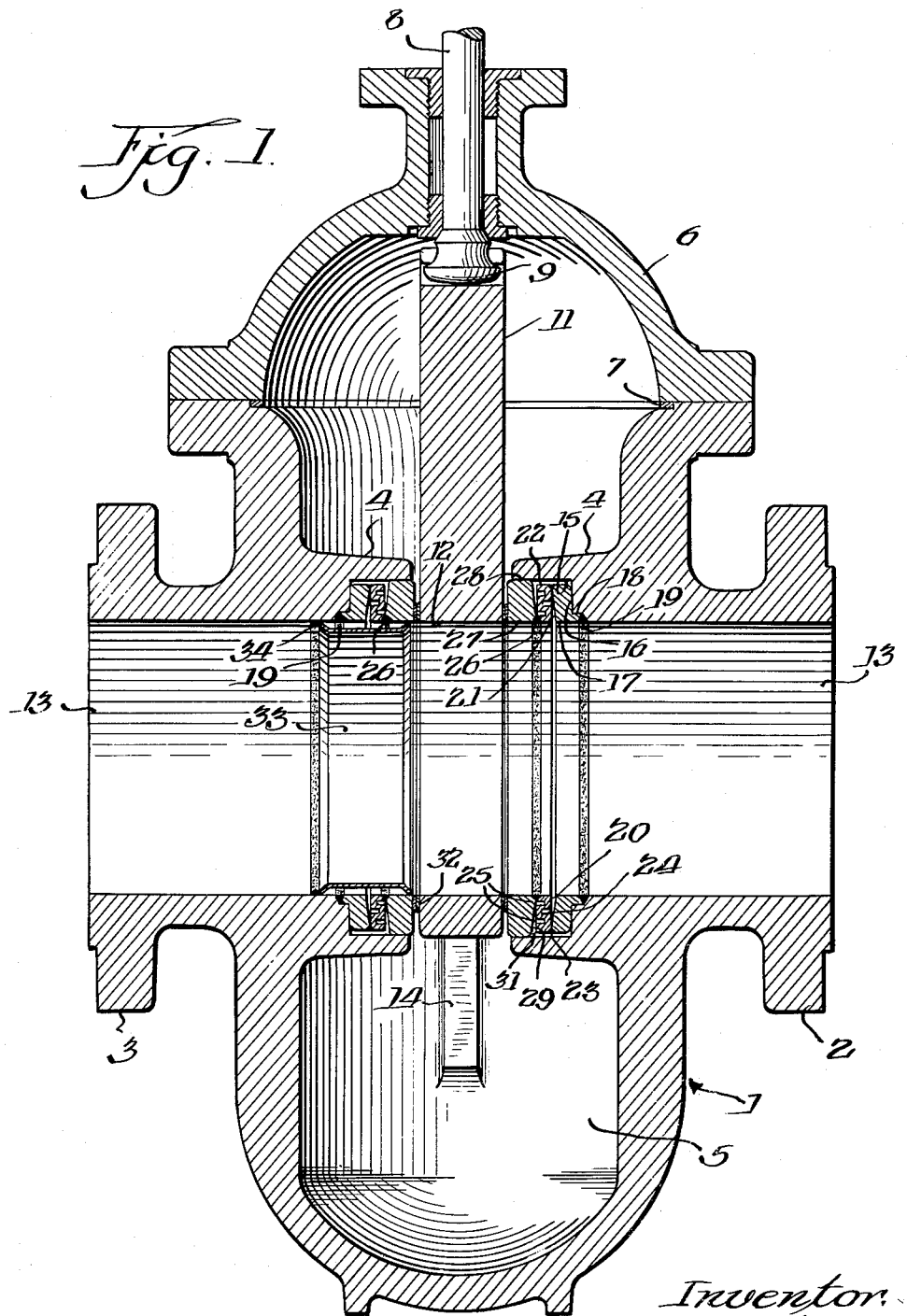

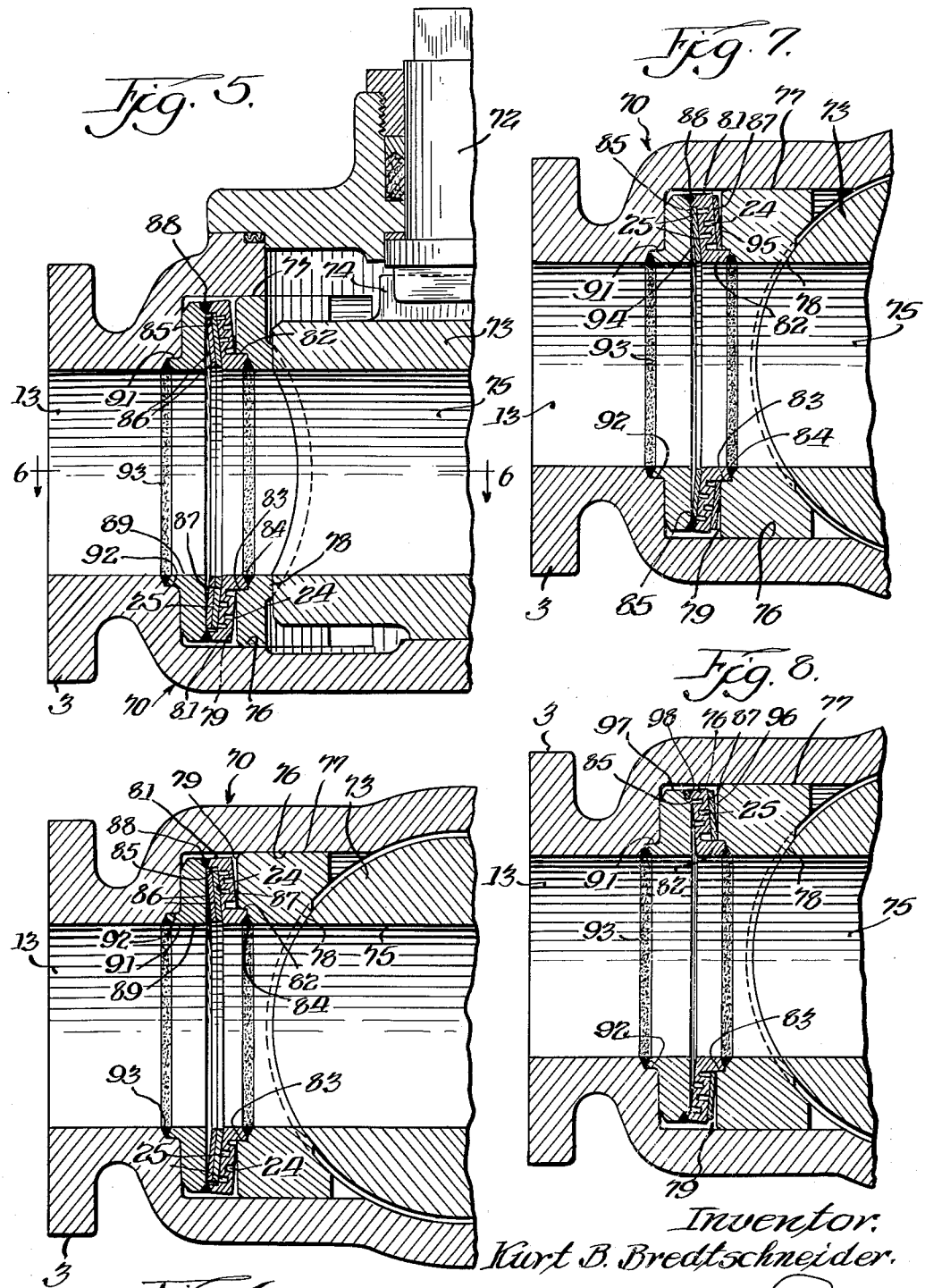

United States Patent Office 3,204,924
Patented Sept. 7, 1965

3,204,924
VALVE SEATS AND MOUNTING THEREFOR
Kurt B. Bredtschneider, Chicago, Ill., assignor to Crane Co., Chicago, Ill., a corporation of Illinois
Filed May 17, 1962, Ser. No. 195,485
8 Claims. (Cl. 251—174)

This invention relates generally to valve seats, and, more particularly, it is concerned with a novel type of valve seat in which the latter member is flexibly mounted and in connection with such flexibility also possesses the benefit of a floating function.

In order to acquire a better appreciation of the background of this invention, it should be understood at the outset that the valve seats of this invention are particularly suitable for high temperature services involving sliding valves, such as gates, rotary valves, such as plug valves, ball valves and the like, particularly in those severe services where such valves during the normal course of service are exposed to critical temperature fluctuations. The latter conditions are frequently encountered where both inlet and outlet tightness is required, such as what is known in the field as block and bleed service, and where in the past it has been found that floating seat rings with rubber or plastic seals and seats are not generally acceptable.

Heretofore, it should also be realized that valves have been available on the market using metallic bellows type seat rings, but the difficulty arising in the use of such construction resides in the practical inability to weld consistently the thin wall bellows to the heavy wall body portion inside of the valve.

Heretofore, in other cases, guides for the bellows members have been employed directly exposed to variations in temperature of the line fluid which has been found to adversely affect the spring action of the bellows member due to the effect of temperature on the materials and foreign matter within the pipeline.

Accordingly, it is an important object of the present invention to provide seat units in which a diaphragm ring of substantial dimensions is welded to an inside ring and to an outside ring relatively removed from the seat and inner ring and then seal welded as a unit on the lip of the outer ring to the valve body removed from the welds on the diaphragm and without danger of distortion of the seat area of the inner ring as will hereinafter become more readily apparent.

Another object is to provide for a valve seat construction in which a differential angle is provided on the shoulder between the diaphragm and the end rings, thereby possessing the advantage that by inserting the closure member subsequently the said diaphragms are deflected to the extent that the roots of the welds employed on the diaphragm are placed under desirable compression as distinguished from tension.

A further object is to provide for such differential angle in flexibly mounted valve seats so that the latter angle determines the maximum deflection on the downstream side of the valve and preferably is so selected that at the maximum deflection of the diaphragm on the downstream side, the upstream seat is still sufficiently deflected whereby to maintain fluid sealing contact between the said upstream seat ring and the valve closure member.

A further object is to provide for a valve seat construction in which the seating unit of this invention permits of the inner rings thereof being guided in the valve body on their outer periphery at the distance removed from the temperature change area or the zone affected by the flow through the valve.

It is a further object to provide that in certain cases a heat shield member can be conveniently provided in the valve port on the inside of the flexible unit thereby to protect the guides on the inner rings to a substantial extent against the distortion and failure normally caused by temperature changes in the valve.

It is a further important object to provide for the employment of a desirable type of diaphragm of annular form in which the flexibility of said diaphragm is obtained by means of corrugations preferably formed by concentric grooves on both sides of the diaphragm. The latter may be either forged, stamped, or otherwise suitably fabricated.

A further object is to provide that in connection with such diaphragm grooves as herein above referred to, filler rings can be employed conveniently to fit within the concentric grooves whereby to beneficially increase the supported area between the diaphragm and end rings.

A further object is to provide for a construction in a valve seat assembly wherein the fluid pressure on the upstream side acting on the ring area between the diaphragm outside diameter and the seat diameter of the valve will function as an additional shut-off force thereby to assist the end thrust or force exerted by the upstream diaphragm.

A still further important object lies in the provision that the seat assembly of this invention is capable of accommodating resilient members of the type commonly referred to as the Belleville springs and thus aid in the functioning of the corrugated diaphragm to increase the force available to maintain the fluid sealing contact between the seat upstream unit and the closure member and obtain desirable upstream tightness.

Other objects and advantages will become more readily apparent upon proceeding with the following description read in light of the accompanying drawings, in which:

FIG. 1 is a sectional assembly view of a conduit gate valve embodying one form of a seat assembly of my invention;

FIG. 2 is a fragmentary sectional assembly view of a ball valve embodying a seat assembly of this invention;

FIG. 3 is a magnified fragmentary sectional view of the seat assembly referred to in FIG. 2;

FIG. 4 is a modified form of seat assembly in which annularly disposed filler support members for the diaphragm are employed; and FIGS. 5 to 8 inclusive are fragmentary sectional assembly views of modified forms of the seat assembly embodying this invention.

Similar reference numerals refer to similar parts throughout the several views.

Referring now to FIG. 1, a conventional pipe line or conduit gate valve is shown having the casing generally designated 1 with the usual end connecting flanges 2 and 3 for attachment to a pipe line (not shown). The valve body or casing 1 has the oppositely disposed integral inwardly extending recessed portions 4 for receiving the valve seat rings hereinafter described in detail. The valve casing at a median portion thereof has the usual valve chamber 5 and at the upper portion thereof the said chamber is capped by means of the usual bonnet 6 attached by bolts (not shown) to the valve casing as indicated with the fluid sealing gasket 7 therebetween. A valve stem 8 reciprocally movable is provided with a T-head 9 or similar suitable means for attachment to a ported closure member 11. In this type of valve construction, it will be noted that the said closure member is provided with a central apertured portion 12 which in the open position of the valve is axially aligned with the valve ports 13 as shown.

The closure member is preferably, but not necessarily, guided as shown by means of a vertical rib 14 integral with the valve casing. The said inwardly extending integral portions 4 of the casing as previously mentioned are recessed as at 15 and annularly shouldered as at base surface 16 to receive the outer ring 17, the latter being provided at its outer annular portion with the guide extension or hub 18, the latter being weld sealed attached as at 19 within the casing port 13 as indicated. The inner annular surface 21 of the outer ring 17 is preferably sloped in a direction toward the port 13 for reasons hereinafter explained. In direct contact with the said inwardly sloped surface 21, a corrugated diaphragm 22 is annularly welded as at 23 to the outer ring 17 preferably on the outer periphery of the latter member to cooperate with the sloped surface 21 and thereby an annular space 20 therebetween, which reduces gradually in its width to the annular contact indicated at its outer periphery and as defined by the peripheral weld seal 23. The said corrugated diaphragm on one side depending on its size may be provided with one or more annular grooves 24 and on an opposite side with similar grooves 25 preferably so arranged as not to interfere with the thickness and strength of the diaphragm, the diaphragm being attached on its inner periphery as indicated at 26 to the inner ring 27. The latter ring is relatively closely received within the recess 15 for sliding engagement therewith as indicated at 28.

The outer surface of the ring 27 is annularly tapered as at 29 thereby to form with the diaphragm 22 a second annular space 31 extending between the diaphragm and the tapered surface 29. The inner annular surface of the said inner ring 27 as at 32 is provided with the usual hard facing for slidable fluid sealing engagement with the reciprocally movable closure member 11.

Thus, in effect, it will be appreciated that the arrangement of the diaphragm 22 and its respective annular surfaces 24 and 25 cooperate with the tapered annular surfaces 21 and 29 respectively of the outer ring 17 and the inner ring 27, whereby to allow for the introduction of line fluid pressure within the tapered annular surfaces extant between the diaphragm and said inner and outer rings 27 and 17 respectively. Thus, in effect, allowance is made for line fluid pressure to enter the said spaces 20 and 31 in addition to the grooves 24 and 25, the over-all effect being to permit the diaphragm under the influence of the interposed line fluid pressure to force the inner ring 27 against the closure member 11 whereby to insure of valve tightness in the contact between the seat surface 32 of the inner ring 27 in its sliding bearing against the closure member 11.

For purpose of protecting the diaphragm and the seat rings against direct contact with the line fluid flow, a heat shield 33 may be employed being attached by a suitable annular weld as at 34 to the surface defining the valve port.

Referring now to FIG. 2, a fragmentary sectional assembly view of a ball valve is shown, having a casing 1 formed by suitably joining the end disposed flanged members 35 and 36. The latter end members are preferably joined by a split ring coupling 37 wherein the bolts (not shown) are suitably applied to the split ring coupling and engagement of the ring is made with the annular surfaces 38 and 39. Such engagement draws the members 35 and 36 together to form the overall casing for receiving the rotatable ported ball closure member 41. The latter member is journally mounted by means of a suitable actuated stem 42 to engage the closure member 41 as at 43 in non-rotatable relation thereto. Upon 90° rotation of the stem, the closure member is rotatably moved to open, closed, and throttled positions as desired.

The stem is journalled within the centerpiece 44 and serves as the spacing means by which the member 37 holds the outward extension 44 in position. Suitable sealing means is preferably annularly provided as at 45. At the upper end thereof, the stem 42 is provided with a shoulder 46, the stuffing nut 47 bearing against the thrust washer 48 mounted on the collar 46, whereby to suitably bear against the gland 49 and compress the packing 51. The general valve construction described here follows our patent application Serial No. 153,608, filed November 20, 1961, now Patent No. 3,091,428 granted May 28, 1963. The valve seat supporting members 35 and 36 are suitably recessed as at 52 and at the outer end portions of the recess are annularly shouldered as at 53 and threaded as at 54 to receive the outer threaded ring 55.

At its outer periphery, the integral annular guide portion 56 is provided on the threaded ring, the outer limits of which are welded as at 57 to the ports 13 of the respective members 35 and 36. Fitted snugly against the inner annular surface 58 a corrugated diaphragm 59 is mounted provided with the corrugations 24 and 25. In this case, the diaphragm is of a dished form, and as indicated, at its outer periphery, is welded at 61 to the threaded ring 55. The surface 58 in this construction extends in a plane at right angles to the port axis of the valve and thereby forms with the dished corrugated diaphragm the port communicating annular space 62. Similarly, the corrugated diaphragm 59 is weld sealed as at 63 on its inner periphery, whereby to provide outwardly of the latter weld the annular space 64 between the diaphragm and the inner seat ring 65. The latter ring is slidably received for predetermined and limited axial movement within the recess defined at 52. Depending upon the nature of the service involved the ring 65 may carry a seat contact member as at 66 for direct bearing against the closure member 41 in maintaining valve fluid tightness.

It will be appreciated that prior to the final welded assembly the construction described permits of axial adjustment of the units of the screwed seat ring assembly to make tight contact with the ball closure member because of the threads at 54 provided on the outer seat rings 55. The arrangement is suitably adjusted by means of the annularly arranged lugs 67 designed for suitable engagement by a spanner wrench or the like in affecting such adjustment.

Referring now to FIG. 4, which is a modification of the general construction shown in FIG. 1, it will be appreciated that under certain conditions that the corrugations of the diaphragm 22 should be internally supported to avoid undue deformation under severe service conditions. This is preferably accomplished by interposing a plurality of relatively hard filler rings 68, 69, and 71, preferably of a metal and of a height approximating the depth of the respective grooves 24 and 25 and substantially filling and supporting the diaphragm corrugations for the purpose above mentioned. It will be clear that while reference is made to the construction of this modification in its application to the pipe line valve of FIG. 1, obviously, it may also be used in FIG. 2 as well as in the other valve forms hereinafter to be described.

Referring now to FIGS. 5 and 6, the novel seat mechanism of this invention is shown in its application to a ported rotary valve, such as a plug valve, for example. Since the valve is of the rotary type, it is deemed unnecessary to make any further description here other than to state that a rotating stem 72 non-rotatably engages the closure member 73 at 74. The closure member is of the cylindrical type, as shown more clearly in the plan view of FIG. 6, and being ported as at 75 it allows for fluid flow therethrough, depending upon the direction of rotation relative to the valve casing generally designated 70. Similarly, in the manner described in connection with the previous figures, the casing 70 at 76 is suitably recessed to receive the modified valve seat assembly of the instant modified form of the invention. Here the inner ring 77 is formed at its inner annular surface with a seat contact surface 78 for fluid sealing engagement with the closure member 73. The outer periphery of the inner seat 77 is defined by the annular surface 79 against which surface the inner portion of the diaphragm 81 formed with a guide extension portion 82 is relatively snugly received within the annular recess 83 of the inner seat member 77 as indicated. At its inner limit the said extension 82 is weld attached at 84 to said inner seat member.

At its outer peripheral portion, the corrugated diaphragm 81 is walled to provide a recess as at 85 to receive at least one or a plurality of Belleville or dished washers (depending on size and service) as indicated at 86, the latter washers being nested within the recess 85 to bear against the surface 87 of the corrugated diaphragm 81, and overlie the diaphragm corrugations 25. On its outer periphery, the corrugated diaphragm is weld seal attached as at 88 to the outer seat member 89, the latter being provided with the annular guide extension 91 received within the casing recess 92 and weld sealed as at 93 to the inner wall of said casing port 13. In summary, it will be appreciated that between the outer ring and the diaphragm one or more types of springs other than the dished may be enclosed before the diaphragm is actually welded to the outside ring. Such use of the peripheral spring construction is employed to increase the end force or thrust available to maintain the fluid sealing contact between the upstream seat unit and the rotary closure unit whereby to improve the upstream tightness of the valve.

Referring now to FIG. 7, in which a further modification of the construction shown in connection with FIGS. 5 and 6 is shown, in this construction as distinguished from FIGS. 5 and 6, the peripheral washers or springs 94 and 95 are mounted in axially spaced apart relation in that the springs, as indicated, are positioned on both sides of the diaphragm 81, the construction otherwise identical to that shown and described in connection with FIGS. 5 and 6. It will be appreciated here that the Belleville springs 94 and 95 may be of different diameters in order that the inner or larger spring may preferably enclose the guide extension 82 of the corrugated diaphragm 81. Similarly the outer washer or spring is of a smaller diameter to permit its being received within the recessed portion 85. In this construction, the depth of the said recess portion is preferably less than that in connection with FIG. 5 because of receiving only a single spring. In this construction as in connection with FIGS. 5 and 6, it will be apparent that the Belleville springs 94 and 95 supplement the seating force provided by the corrugated diaphragm 81 against the closure member.

Similarly, and as described in connection with FIG. 7, the further modification of this invention shown in FIG. 8 applies to a rotary valve construction in which only a single Belleville spring or dished washer 96 is employed, applied on one side of the corrugated washer and interposed between the outer portion of the guide extension 82 and the recess portion 76, thereby to bear directly against the surface 87 and overlie the diaphragm corrugations 25 as illustrated. In this construction, it will be noted that the outer ring 97 is provided with a reduced annular extension portion 98 to fit within the recess 85 of the corrugated diaphragm 81, the said outer ring being welded as at 93 to the casing 70 in a manner similar to that described in connection with the previous figure. Thus, as in the construction described in connection with FIGS. 5 to 7 inclusive a single Belleville spring may be employed to provide a sufficient resiliency to the force applied by the corrugated diaphragm 81 to maintain the inner seat member 77 firmly in seated or fluid sealing position against the rotary closure member 73.

While several embodiments of this invention have been disclosed herein, it will be understood that the invention may be embodied in a wide variety of valve seats or the like, substantially modified and differing from those forms specifically illustrated and described. Accordingly, it is not intended that the invention be limited otherwise than as required by the scope of the appended claims interpreted in light of the art.

I claim:
1. A ported valve body, a valve seat assembly therefor, and a closure member cooperating with said seat assembly;
   the combination of inner and outer annular members constituting a portion of said valve seat assembly;
   diaphragm means of annular configuration interposed between an inner face of the outer annular member and an outer face of said inner annular member;
   at least one of said latter faces being sloped whereby upon assembly of said diaphragm means between said faces, said diaphragm means will be deflected limitedly to impart a longitudinal force against said valve seat in a direction toward said closure member;
   and weld means for joining said diaphragm means to both of said annular members in fluid sealing relation.
2. The subject matter of claim 1,
   the said diaphragm means and said outer annular member having an annular space therebetween converging at an outer peripheral portion thereof;
   the area of said convergence being defined by the said weld means forming the attachment of said diaphragm means with said outer annular member to contribute to said longitudinal force imparted against said valve seat by line fluid pressure normally applied to said convergence area.
3. The subject matter of claim 1, the said outer annular member having an outer annular reduced shank for snug weld sealed engagement with an annular recessed portion of the body forming a portion of said body port.
4. The subject matter of claim 1, the said diaphragm means being weld attached at an inner peripheral portion to an inner annular portion of the said inner annular member.
5. The subject matter of claim 1, the said diaphragm means being corrugated with concentric ring grooves on both sides thereof and forming with said inner and outer annular members annular converging spaces on both sides of said diaphragm means.
6. The subject matter of claim 1, the said diaphragm means being corrugated and having concentric ring grooves on both sides thereof.
7. The subject matter of claim 5, relatively hard filler rings for said concentric grooves whereby to increase the supported area between the said daphragm means and said annular members and avoid undue distortion of said diaphragm means under severe service conditions.
8. The subject matter of claim 1, the said inner and outer annular members having therebetween an annular space;
   Belleville spring means in said annular space cooperating with the said diaphragm means and said inner annular member whereby to increase the end force or thrust to maintain the contact of the said seat with the closure member.

References Cited by the Examiner

UNITED STATES PATENTS

| | | | |
|---|---|---|---|
| 1,489,857 | 4/24 | Stevens | 251—174 |
| 1,942,155 | 1/34 | Stevens | 251—174 X |
| 2,191,232 | 2/40 | Heinen | 251—174 |
| 2,603,449 | 7/52 | Overholser | 251—172 |
| 2,772,848 | 12/56 | Holzer | 251—172 X |
| 2,777,664 | 1/57 | Bryant | 251—174 |
| 2,799,470 | 7/57 | Margrave | 251—172 |
| 3,042,359 | 7/62 | Bredtschneider | 251—172 |

ISADOR WEIL, *Primary Examiner.*

CLARENCE R. GORDON, *Examiner.*